Patented Apr. 13, 1943

2,316,653

UNITED STATES PATENT OFFICE 2,316,653

CONDENSATION PRODUCTS OF ACETYLENE WITH DIMETHYLOL UREA

Walter Reppé, Ernst Keyssner, and Otto Hecht, Ludwigshafen-on-the-Rhine, Germany, assignors, by mesne assignments, to General Aniline & Film Corporation, New York, N. Y., a corporation of Delaware No Drawing. Original application July 1, 1938, Serial No. 216,962. Divided and this application March 20, 1941, Serial No. 384,346. In Germany July 28, 1937

7 Claims. (Cl. 260—70)

The present invention relates to condensation products of acetylene with dimethylol urea. This application has been divided out from application Ser. No. 216,962, filed July 1, 1938 now Patent No. 2,273,141.

We have found that condensation products of acetylene with dimethylol urea can be obtained by treating dimethylol urea with acetylene in the presence of catalysts.

Suitable catalysts are the heavy metals of the first and second groups of the periodic system and their compounds, in particular copper and its salts, as for example copper chloride or cuprous chloride, copper acetate, copper formate or acetylene-copper compounds. It is often preferable to use either basic compounds, such as ammonia or amines or ammonium or amine salts, alkali or alkaline earth metal salts during the condensation or to carry out the process in a weakly acid medium. The process may be carried out in the presence or absence of solvents, as for example water or organic solvents miscible with water, such as alcohols, dioxane or low molecular fatty acids. The temperatures depend on the substance used; the condensation often takes place even at ordinary or slightly elevated temperature. Generally speaking, the temperatures necessary for the reaction do not exceed about 120° C. It may be carried out at atmospheric pressure, and also under increased pressure, for example at pressures between 2 and 40 atmospheres. Highly concentrated acetylene or acetylene diluted with any foreign gases may be used, as for example electric arc acetylene.

The condensation products obtained are, by reason of their triple unsaturated carbon linkage, especially reactive and may be subjected to polymerization.

The following example will further illustrate how this invention may be carried out in practice but the invention is not restricted to this example. The parts are by weight.

Example 302 parts of dimethylolurea (obtainable for example in the manner described in U. S. Patent No. 1,989,628), 1280 parts of methanol and 7 parts of cuprous chloride are treated in a pressure-tight vessel at from about 80° to 30° C. with a mixture of equal parts of nitrogen and acetylene under a pressure of 20 atmospheres. After from about 20 to 24 hours, 1 molecular proportion of acetylene has been absorbed, and the reaction is completed. The reaction mixture is filtered and the methanol distilled off from the filtrate at from about 30° to 50° C. under a pressure of from 25 to 50 millimeters (mercury gauge). There are thus obtained from 270 to 300 parts of highly elastic resin which may be dissolved for example in ethylene glycol monomethyl ether or monoethyl ether. After evaporation of the solvent, a hard insoluble product is obtained after about 1½ days.

What we claim is:

1. A process for the production of condensation products of acetylene with dimethylol urea which comprises treating dimethylol urea with acetylene at temperatures between 20° C. and 120° C. and at pressures between atmospheric pressure and 40 atmospheres in the presence of a catalyst selected from the group consisting of acetylides and salts of heavy metals of the first and second group of the periodic system.

2. A process for the production of condensation products of acetylene with dimethylol urea which comprises treating dimethylol urea with acetylene at temperatures between 20° C. and 120° C. and at pressures between atmospheric pressure and 40 atmospheres in the presence of copper acetylide.

3. A process for the production of condensation products of acetylene with dimethylol urea which comprises treating dimethylol urea with acetylene at temperatures between 20° C. and 120° C. and at pressures between atmospheric pressure and 40 atmospheres in the presence of a solvent and of copper acetylide.

4. The condensation product of acetylene and dimethylol urea obtained by treating dimethylol urea with acetylene at temperatures between 20° C. and 120° C. and at pressures between atmospheric pressure and 40 atmospheres in the presence of a catalyst selected from the group consisting of acetylides and salts of heavy metals of the first and second group of the periodic system.

5. The process as defined in claim 1 wherein the acetylene is utilized in admixture with nitrogen.

6. A process for the production of condensation products of acetylene with dimethylol urea which comprises treating dimethylol urea with acetylene at a temperature between about 20 to 30° C. under a pressure of about 20 atmospheres in the presence of a solvent and of cuprous chloride.

7. The condensation product of acetylene and dimethylol urea obtained according to the process of claim 6.

WALTER REPPE.
ERNST KEYSSNER.
OTTO HECHT.

Certificate of Correction

Patent No. 2,316,653.                                April 13, 1943

WALTER REPPÉ ET AL.

It is hereby certified that error appears in the printed specification of the above numbered patent requiring correction as follows: Page 1, first column, line 49, for "80° to 30° C." read *20° to 30° C.*; and that the said Letters Patent should be read with this correction therein that the same may conform to the record of the case in the Patent Office.

Signed and sealed this 29th day of April, 1947.

[SEAL]

LESLIE FRAZER,
*First Assistant Commissioner of Patents.*